United States Patent [19]

Kramer et al.

[11] Patent Number: 4,894,009

[45] Date of Patent: Jan. 16, 1990

[54] APPARATUS FOR CONTACTLESS SEALING OF AN OPENING AGAINST EMERGING OR ENTERING GAS

[76] Inventors: Carl Kramer, Am Chorusberg 8; Hans J. Gerhardt, Lousbergstrasse 58, both of, 5100 Aachen, Fed. Rep. of Germany

[21] Appl. No.: 288,228

[22] Filed: Dec. 22, 1988

[30] Foreign Application Priority Data

Dec. 22, 1987 [DE] Fed. Rep. of Germany ....... 3743598

[51] Int. Cl.[4] .............................................. F27B 7/00
[52] U.S. Cl. ......................................... 432/64; 34/242
[58] Field of Search ..................... 34/242, 4; 98/36; 432/64

[56] References Cited

U.S. PATENT DOCUMENTS

| | | | |
|---|---|---|---|
| 3,510,113 | 5/1970 | Wise | 432/64 |
| 3,575,398 | 4/1971 | Lincoln | 432/64 X |
| 4,268,977 | 5/1981 | Geiger | 34/242 |
| 4,622,762 | 11/1986 | Reed | 34/242 X |

Primary Examiner—Harold Joyce
Attorney, Agent, or Firm—Kerkam, Stowell, Kondracki & Clarke

[57] ABSTRACT

An apparatus for contactless sealing of an opening against emerging or entering gas employs at least one barrier gas jet which is divided in the vicinity of its longitudinal axis. In the two sub-jets adjoining the dividing plane two different gases flow out, the concentration of the two gases changes abruptly at said dividing and separating plane so that a very reliable sealing is achieved.

12 Claims, 5 Drawing Sheets

Switching Arrangement: Sealing Unit with Divided Concentration Nozzle

APPARATUS FOR CONTACTLESS SEALING OF AN OPENING AGAINST EMERGING OR ENTERING GAS

BACKGROUND OF THE INVENTION

1. Field of the Invention

The invention relates to an apparatus for contactless sealing of an opening against emerging or entering gas by means of at least one barrier gas jet.

2. Description of the Prior Art

In plants and apparatuses in which passing materials or products are subjected to gas streams in closed chambers the sealing of the inlet and exit openings of said chamber represents a problem. This is true in particular when the goods to be treated have sensitive surfaces so that a contact sealing, for example by means of a fabric curtain or an engaging brush or roller, is out of the question. In such a case contactless sealings must be provided as can be realized only with jet curtains.

In such contactless sealing in many cases it must additionally be ensured that mixing of the outer atmosphere with the atmosphere within the chamber to be sealed is avoided. This is particularly important when, for example, in protective-gas-operated plants or in driers the entry of atmospheric oxygen must be avoided at all costs for process or safety reasons.

However, due to the turbulence generated by a jet a jet stream always leads to intense mixing between the jet curtain on the one hand and the outer atmosphere on the other so that the conventional apparatuses for contactless sealing do not meet the requirements made.

Various publications deal with jet seals for compensating a pressure difference, i.e. for avoiding large-area flowing through of the opening to be sealed due to the pressure difference between the environment and the interior space to be sealed. A fundamental investigation has been carried out in a dissertation written at The Technical University of North-Rhine Westfalia in Aachen in 1983 by H. W. Kuster. It was found that although by means of a slit jet inclined with respect to the pressure gradient or by means of a corresponding arrangement of jet openings, which in effect also produce a slit jet, a pressure difference can be compensated; due to the already mentioned jet mixing, however, a turbulent exchange always occurs between the space to be sealed and the environment and this cannot be tolerated for many uses. As these investigations show, a concentration sealing which would prevent the exchange between the outer atmosphere and the interior of the chamber can be achieved with a jet; however, for this purpose slit jets are necessary having exit nozzle openings which are so dimensioned that the edge face of the opening to be sealed disposed opposite the slit nozzle is still subjected fully to the core jet. This requires either very narrow openings or relatively wide jets which in turn lead to a high gas consumption.

A further disadvantage resides in that with the slit jet a part of the amount of gas ejected from the slit nozzle (which in this case corresponds to the plant atmosphere) is blown into the outer atmosphere and mixed therein. This is, however, for safety reasons along usually not permitted in apparatuses in which, for example, dangerous or noxious gases circulate within a chamber to be sealed.

SUMMARY OF THE INVENTION

The invention therefore has as its object to provide an apparatus for contactless sealing of an opening against emerging or entering gas of the category referred to in which the aforementioned disadvantages do not occur.

In particular, an apparatus is to be proposed which with low gas consumption avoids the mixing of the outer atmosphere with the atmosphere in the chamber to be sealed.

The invention therefore proposes in an apparatus for contactless sealing of an opening against emerging or entering gas by means of at least one barrier gas jet the improvement that the or each barrier gas jet is divided in the vicinity of its longitudinal axis along a separating plane and that in the two sub-jets adjoining the separating plane different gases flow out.

Advantageous forms of embodiment are defined by the features of the subsidiary claims.

The advantages achieved with the invention are based on the formation of a jet curtain which can be used both for concentration sealing and for pressure sealing and which seals an inlet and/or outlet opening of a chamber in such a manner that no contact can occur between the inner atmosphere and the outer atmosphere. Dangerous gases can also be retained within the chamber.

At the same time the gas in the chamber is prevented from mixing with the outer atmosphere adn consequently for the first time hermetic sealing of a chamber becomes possible. This is achieved with a relatively small gas consumption because the sealing effect does not depend on the amount of gas used but on the fluid-mechanics situation.

BRIEF DESCRIPTION OF THE DRAWINGS

The invention will be described in more detail hereinafter with reference to examples of embodiment with the aid of the attached schematic drawings, wherein.

DESCRIPTION OF THE PREFERRED EMBODIMENTS

Figure 1:
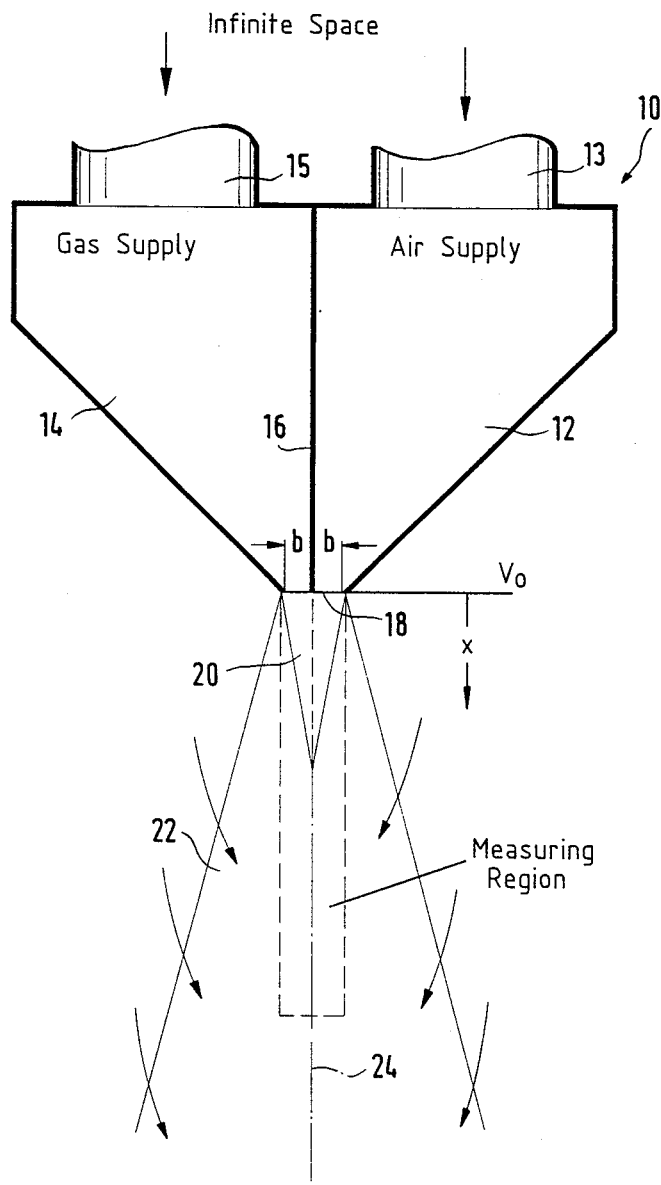
FIG. 1 shows a split nozzle in the separation plane of which two planar sub-jets of different gases are contiguous.

The divided jet nozzle shown in FIG. 1 and indicated generally by the reference numeral 10 generates a jet in an infinite space which in the following will be designated as a "free jet" and consists of two nozzle heads 12 and 14 which are separated from each other by a separating metal sheet 16. The left nozzle head 14 it the illustration of FIG. 1 is supplied via a tube 15 with a gas entering in the direction of the arrow whilst the right nozzle head 12 is supplied via a tube 13 with air. The nozzle heads 12 and 14 taper from the inlet side with the conduits 13 and 15 towards the outside, i.e. the side walls of the nozzle heads 12, 14 extend obliquely towards the separating plate 16 and terminate respectively in a slit nozzle 18.

One half of the free jet emerging from the slit nozzle 18 consists of the air flow leaving the nozzle head 12 and the other half consists of the gas flow leaving the nozzle head 14. The two subflows form a common jet core 20. Since in said jet core 20 the turbulence of the flow is substantially lower than in the mixing zone 22 laterally limiting the jet core 20 there is hardly any exchange between gas and air even in the interface indicated by the reference numeral 24.

Figure 2:
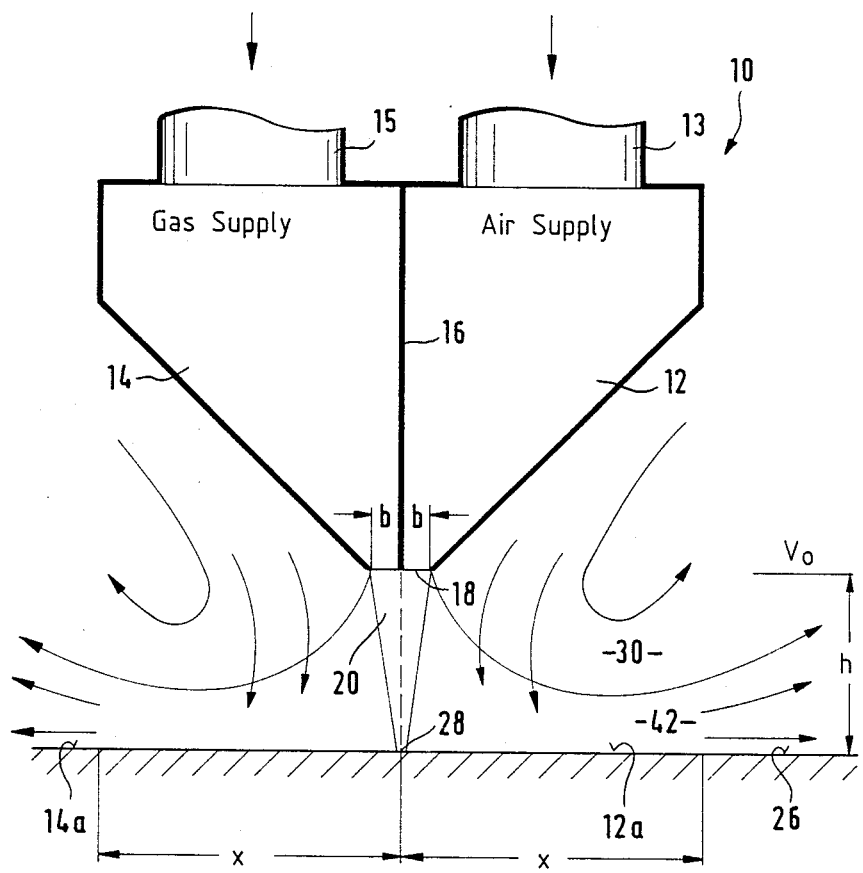
FIG. 2 is a view of the divided nozzle of FIG. 1 for the case where the two sub-jets impinge on an impingement surface lying opposite the ejection opening.

FIG. 2 shows a view in which opposite the slit nozzle 18 of the divided nozzle 10 an impingement surface 26 is disposed; on this impingement surface 26 a stagnation line 28 forms.

On the gas side of said stagnation line 28, i.e. the side 14a opposite the nozzle head 14 of the divided nozzle jet 10 traversed by the gas, the gas stream flows off. In the same manner the air stream emerging from the nozzle head 12 flows off on the side 12a of the impingement surface 26.

Figure 3:
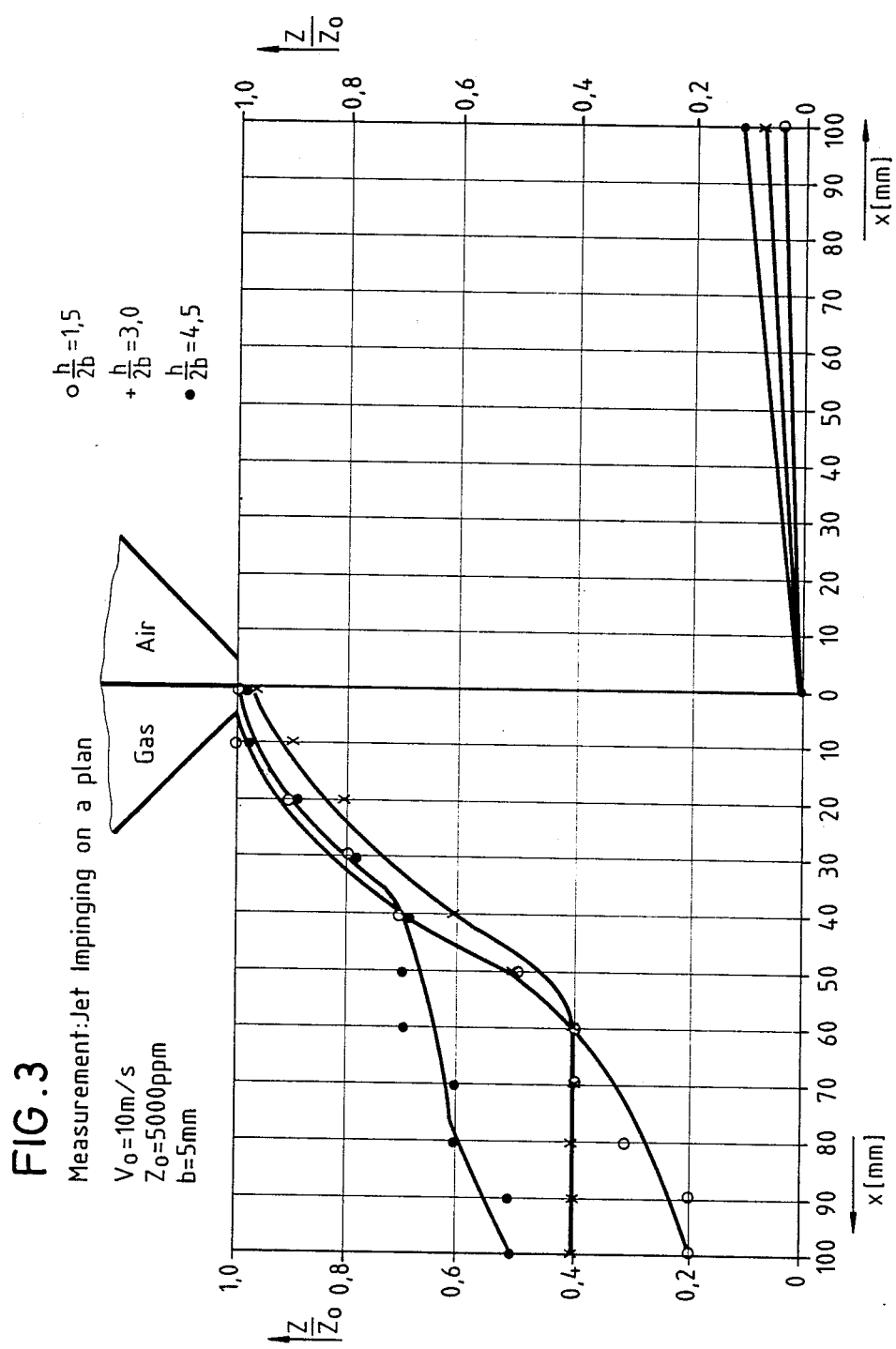
FIG. 3 is a graph of the typical concentration profile in a plane perpendicular to the longitudinal axis of the nozzle outlet cross-section of the sub-jets, i.e. perpendicularly to the separation plane of the two jets in the formation of a jet impinging on a plane.

This gives a clear separation between gas and air as shown by the diagram of FIG. 3 obtained from measured values. For the results illustrated in this diagram and obtained in a model test, the gas flow was stimulated by an air flow to which propane with an initial concentration of 5000 ppm had been admixed. At the measuring points the concentration of the propane in the "gas flow" was measured by a flame ionization detector. The results of the measurement are shown in FIG. 3, expressed as the ratio Z/Zo between the actual concentration Z of the propane in the gas stream at the measuring point and the initial concentration Zo of the propane of 5000 ppm plotted against the distances x from the stagnation point 28 at the impingement surface 26.

In FIG. 2 in addition to the stagnation point 28 the mixing zone 30 and the retardation zone 42 are indicated.

In FIG. 3 the results of the measurement are shown for three different parameters, i.e. for different values of the ratio h/2b, with h=the vertical distance between the stagnation point 28 and the slit nozzle 18 and b=the width of the slit nozzle for the gas or air stream (see FIG. 1).

In the tests a fixed width b of 5 mm and a flow rate Vo of 10 m/s were used.

It can be seen from FIG. 3 that the gas concentration changes abruptly at the separating plane 24 so that in the pure air which is supplied with the air nozzle the gas can no longer be detected. The concentration drop on the gas side is due to the fact that the air stream mixed with the propane, with which the "gas" was simulated, mixes with the ambient air. In practice, on this side the gas atmosphere would be present. On the "air side" there is a slight rise of the propane concentration because the measuring space becomes increasingly contaminated with propane during the measuring operation. The essential feature is, however, the abrupt concentration change in the separating plane 24 which can be clearly detected with measuring techniques.

The results obtained on a model impingement surface can readily be applied to the sealing of a chamber 50, for example of a furnace (cf. FIG. 4), through the inlet opening 52 of which a strip 48 is to be introduced into the chamber 50. Generally, in such a chamber 50 a certain gas atmosphere is present so that one sub-jet of the divided jet nozzle 10 consists of the gas used in the chamber whilst the other sub-jet consists of air. The gas sub-jet faces the chamber 50 whilst the air sub-jet faces the outer atmosphere.

The conditions apparent from FIGS. 2 and 3 result and lead to a physical separation between the chamber 50 of the furnace on the one hand and the outer atmosphere on the other.

Figure 4:
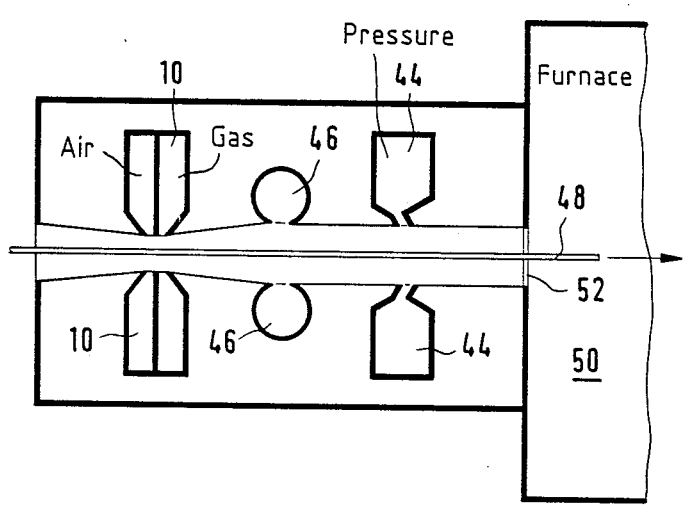
FIG. 4 is a view of the spatial arrangement of divided nozzles, pressure sealing nozzles and suction means provided between said nozzles in an apparatus in which the cross-section above and beneath a strip which enters through an opening to be sealed into a chamber must be sealed in a contactless manner

Now, if with such a divided jet nozzle 10 not only the afore-mentioned concentration sealing is to be obtained but additionally also a pressure sealing, then this can be done in accordance with the embodiment shown in FIG. 4, i.e. an additional pressure sealing nozzle 44 is arranged between the chamber 50 of the furnace and the divided jet nozzle 10 for the concentration sealing which has the structure shown in FIGS. 1 and 2. Due to the inclination of its jet axis with respect to the dominant pressure gradient said further jet nozzle 44 generates a pressure sealing as is apparent from the inclined nozzle opening indicated in FIG. 4.

The volume flow between the two nozzles 10 and 44 must be sucked off with a suction means 46 which is illustrated as suction tube with internal swirl flow and comprises a cylindrical tube into which the sucked off volume flow enters tangentially via a slit-like opening. As a result, in the suction tube a swirl flow arises in which when suction takes place to one side or to both sides a helical flow line path with an increase in the sucking-off direction forms.

In the plant according to FIG. 4 the strip 48 enters the chamber 50 of the furnace horizontally through the inlet opening 52. The strip 48 thus divides the inlet opening 52 of the chamber 50 into an upper and a lower half; to obtain a complete sealing of the inlet opening 52 the nozzles 10, 44 and the suction means 46 must be arranged mirror-inverted on both sides of the strip 48, i.e. respectively opposite each other above and beneath the strip 48 as is apparent in FIG. 4.

Figure 5:
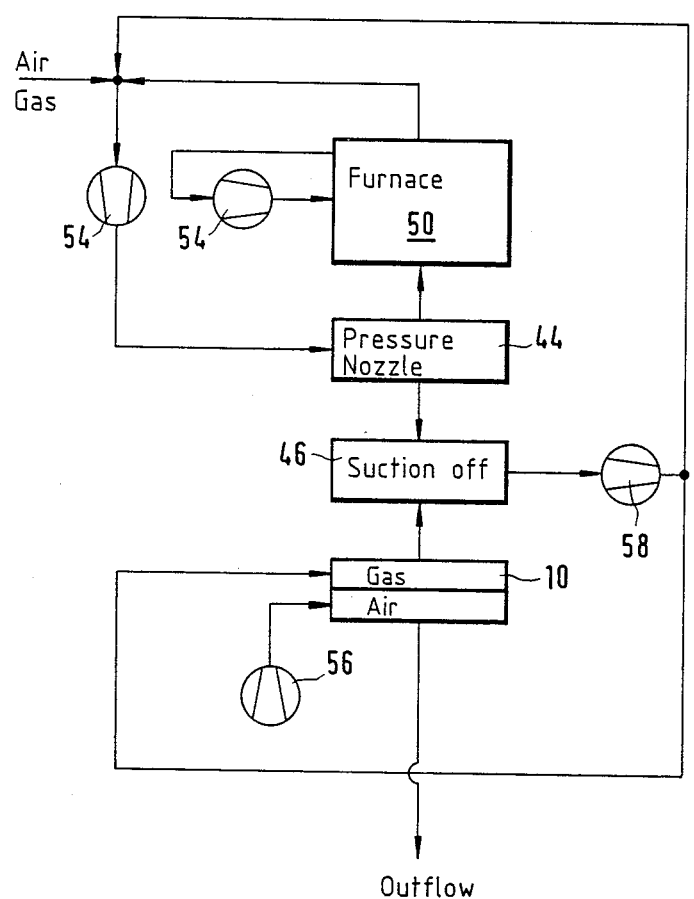
FIG. 5 shows the basic construction of a sealing unit comprising a divided jet nozzle, suction means and pressure sealing nozzle with the necessary flow drives.

FIG. 5 shows the overall structure of an apparatus for sealing the furnace chamber 50, said apparatus having a concentration sealing nozzle 10, a suction means 46, a pressure sealing nozzle 44 and the associated flow drives. It is apparent that the atmosphere of the gas in the chamber 50 of the furnace is circulated by means of a fan 54.

A further fan 54 supplies to the pressure-sealing nozzle 44 the gas which also constitutes the atmosphere in the chamber 50.

The concentration sealing nozzle 10 receives air from a fan 56 and the gas from a gas source (not shown). The suction means 46 is connected to the nozzles 10 and 14 and by means of a fan 58 returns the evacuated gas to the cycle whilst the air flows off to the outside.

For many uses, however, it suffices to provide only the divided concentration sealing nozzle 10, particularly when the pressure gradient between the chamber 50 to be sealed and the environment is not too high, i.e. for example is less than 10 Pa, since in this case the pressure sealing action can be realized by the divided concentration sealing nozzle 10.

We claim:

1. An apparatus for contactless sealing of an opening against emerging or entering gas by means of at least one barrier gas jet, wherein the or each barrier gas jet is divided by a separating plane extending in the vicinity of its longitudinal axis along a separating plane and wherein different gases flow out in the two sub-jets adjoining the separating plane, and wherein the momentum-flow density for the two sub-jets of the or each barrier gas jet in the exit cross-section is identical.

2. An apparatus according to claim 1, wherein with identical or approximately identical density of the two sub-jets the exit velocity is identical or almost identical.

3. An apparatus according to claim 1 for contactless sealing of a chamber filled with a gas with respect to the ambient atmosphere, wherein the sub-jet facing the chamber consists of the gas in the chamber and the other sub-jet facing the outer atmosphere consists of air.

4. An apparatus according to claim 1, wherein the sub-jets each emerge from a slit nozzle of a divided jet nozzle.

5. An apparatus according to claim 4, wherein an impingement surface is disposed opposite the slit nozzle.

6. An apparatus according to claim 5 for contactless sealing of an opening of a chamber through which a strip to be treated is passed, wherein on each side of the strip serving as impingement surface a divided jet nozzle is arranged for supplying the sub-jets.

7. An apparatus according to claim 1 wherein in addition to said at least one barrier gas jet, there is a sealing jet nozzle arranged such that inclination of its jet axis against a present pressure gradient generates a pressure sealing.

8. An apparatus according to claim 7 further comprising a suction means arranged for evacuating at least a portion of the gas from a region between the at least one barrier gas jet and the sealing jet nozzle.

9. An apparatus according to claim 8, wherein the suction means comprises a cylindrical tube into which the sucked-off volume flow enters tangentially via a slit-shaped opening.

10. An apparatus according to claim 8 wherein gas which is evacuated from said region is supplied at least partially to one or more of the following: said at least one barrier gas jet, said sealing jet nozzle, and a chamber which the apparatus is sealing.

11. An apparatus for contactless sealing of an opening against emerging or entering gas by means of at least one barrier gas jet, characterized in that:
- the or each barrier gas jet is divided into two sub-jets in the vicinity of its longitudinal axis along a separating plane (24) extending from a separating plate;
- different gases flow out respectively in the two sub-jets adjoining the separating plane (24);
- the or each barrier gas jet covers in cross-section the opening to be sealed;
- a planar element (26) serving as an impingement surface is disposed on a side of the opening cross-section to be sealed opposite openings of the or each barrier gas jet; and
- on the planar element a stagnation line (28) is formed disposed in the separating plane.

12. An apparatus for contactless sealing of an opening against emerging or entering gas by means of at least one barrier gas jet, characterized in that:
- the or each barrier gas jet is divided into two sub-jets in the vicinity of its longitudinal axis along a separating plane (24);
- different gases flow out respectively in the two sub-jets adjoining the separating plane (24);
- the or each barrier gas jet covers in cross-section the opening to be sealed;
- a planar element (26) serving as an impingement surface is disposed on a side of the opening cross-section to be sealed opposite openings of the or each barrier gas jet; and
- on the planar element a stagnation line (28) is formed disposed in the separating plane.

* * * * *